United States Patent
Han et al.

(10) Patent No.: US 12,143,859 B2
(45) Date of Patent: Nov. 12, 2024

(54) SLICE LEVEL LOAD REPORTING AND BALANCING IN WIRELESS COMMUNICATIONS

(71) Applicant: ZTE Corporation, Guangdong (CN)

(72) Inventors: Jiren Han, Guangdong (CN); Yin Gao, Guangdong (CN); Dapeng Li, Guangdong (CN)

(73) Assignee: ZTE Corporation, Guangdong (CN)

( * ) Notice: Subject to any disclaimer, the term of this patent is extended or adjusted under 35 U.S.C. 154(b) by 364 days.

(21) Appl. No.: 17/805,102

(22) Filed: Jun. 2, 2022

(65) Prior Publication Data

US 2022/0295349 A1    Sep. 15, 2022

Related U.S. Application Data

(63) Continuation of application No. PCT/CN2020/091570, filed on May 21, 2020.

(51) Int. Cl.
*H04W 28/08* (2023.01)
*H04W 24/08* (2009.01)
(Continued)

(52) U.S. Cl.
CPC ....... *H04W 28/0942* (2020.05); *H04W 24/08* (2013.01); *H04W 24/10* (2013.01); *H04W 28/082* (2023.05); *H04W 28/16* (2013.01)

(58) Field of Classification Search
CPC . H04W 28/0942; H04W 24/08; H04W 24/10; H04W 28/082; H04W 28/16;
(Continued)

(56) References Cited

U.S. PATENT DOCUMENTS

| | | | |
|---|---|---|---|
| 2015/0351118 A1* | 12/2015 | Arnott | H04W 16/14 370/252 |
| 2018/0324663 A1 | 11/2018 | Park et al. | |

(Continued)

FOREIGN PATENT DOCUMENTS

| | | |
|---|---|---|
| CN | 108259151 | 7/2018 |
| CN | 109076446 | 12/2018 |

(Continued)

OTHER PUBLICATIONS

First Office Action for Co Pending CN Application No. 202080098122.2, date Jan. 20, 2024, 15 pages with unofficial English Summary.

(Continued)

*Primary Examiner* — Charles C Jiang
*Assistant Examiner* — Shawn D Miller
(74) *Attorney, Agent, or Firm* — Perkins Coie LLP (57) ABSTRACT

Methods, apparatus, and systems for providing effective slice-level load metrics reporting and load balancing are disclosed. In one example aspect, a wireless communication method includes transmitting, by a first network element, a request to a second network element requesting resource status at a slice level of a slice. The slice represents a logical network of a physical network infrastructure. The method also includes receiving, by the first network element, load information at the slice level from the second network element in response to the request.

20 Claims, 5 Drawing Sheets

300

(51) Int. Cl.
*H04W 24/10* (2009.01)
*H04W 28/082* (2023.01)
*H04W 28/16* (2009.01)

(58) Field of Classification Search
CPC ....... H04L 45/85; H04L 47/125; H04L 47/78; H04L 45/64
See application file for complete search history.

(56) References Cited

U.S. PATENT DOCUMENTS

| | | | |
|---|---|---|---|
| 2019/0174561 A1* | 6/2019 | Sivavakeesar | ........ H04W 48/12 |
| 2019/0320436 A1 | 10/2019 | Han et al. | |
| 2020/0015293 A1 | 1/2020 | Wang et al. | |
| 2020/0044943 A1* | 2/2020 | Bor-Yaliniz | ............ H04L 41/18 |
| 2020/0068653 A1 | 2/2020 | Li et al. | |

FOREIGN PATENT DOCUMENTS

| | | |
|---|---|---|
| CN | 109275151 | 1/2019 |
| CN | 109842910 | 6/2019 |
| CN | 110972107 | 4/2020 |
| WO | 2019/105095 | 6/2019 |
| WO | 2020/063404 | 2/2020 |

OTHER PUBLICATIONS

International Search Report and Written Opinion for PCT/CN2020/91570, date Feb. 2, 2021, 7 pages.

LG Electronics "Load information exchange via Xn and F1" 3GPP TSG-RAN WG3 #105bis R3-195374 Chongqing, China, Oct. 14-18, 2019, 3 pages.

Extended European Search Report for Co Pending EP Application No. 20894974.3, date Nov. 22, 2022, 12 pages.

Second Office Action for Co Pending CN Application No. 202080098122.2, date Jul. 30, 2024, 14 pages with machine translation.

Nokia et al. (TP for SON BL CR for TS 38.463) Load reporting updates 3GPP TSG-RAN WG3 Meeting #107bis-e; R3-202746; E-meeting, Apr. 20-30, 2020 17 pages.

* cited by examiner

SLICE LEVEL LOAD REPORTING AND BALANCING IN WIRELESS COMMUNICATIONS

CROSS-REFERENCE TO RELATED APPLICATION

This application is a continuation and claims priority to International Application No. PCT/CN2020/091570, filed on May 21, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques related to providing detailed slice-level load information between network elements in a wireless communication network to achieve slice-level load balancing.

In one example aspect, a wireless communication method is disclosed. The method includes transmitting, by a first network element, a request to a second network element requesting resource status at a slice level of a slice. The slice represents a logical network of a physical network infrastructure. The method also includes receiving, by the first network element, load information at the slice level from the second network element in response to the request.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

A self-organizing network (SON) is an automation technology designed to make the planning, configuration, management, and optimization of mobile radio access networks simpler and faster. Functionality and behavior of the SON has been defined and specified by organizations such as 3rd Generation Partnership Project (3GPP) and the Next Generation Mobile Networks (NGMN). In particular, Mobility Load Balancing (MLB) is an important function in SON using which the network can distribute the cell load evenly and offload users from one cell, one carrier, or one Radio Access Technology (RAT) to another. The MLB can increase the system capacity and improve the user experience. In addition, the MLB is able to minimize the human intervention in the network management and manual optimization tasks.

To enable effective MLB for New Radio (NR) communication systems, certain load metrics have also been introduced. For example, in addition to the cell level load metrics in Long Term Evolution (LTE) communication systems, beam-level load metric and network slice level load metric are introduced. Network slicing is a network architecture that enables the multiplexing of virtualized logical networks on the same physical network infrastructure. A network slice is an isolated end-to-end logical network tailored to fulfil diverse requirements requested by a particular application. With network slicing, it is possible for Mobile Network Operators (MNOs) to provide different service requirements to different customer in the form of different slice types.

In New Radio (NR) technology, new architectures and new features of the base station (also referred to as gNB) have also been introduced. For example, the interface between different gNBs is called the Xn interface, as compared to the X2 interface between base stations in LTE communication systems (also referred to as eNBs). In addition, a gNB can be split into two parts: a Central Unit (CU) and a Distributed Unit (DU). A gNB-CU can be further divided into two parts: Control Plane (CP) CU and User Plane (UP) CU. The interface between the gNB-CU and gNB-DU is called the F1 interface, while the interface between the gNB-CU-CP and gNB-CU-UP is called the E1 interface.

Slice-level load information can be used to indicate resource status within a Next Generation Radio Access Network (NG-RAN) node (e.g., over the Xn interface) and to minimize impact of congested slices among NG-RAN nodes. The current NR specification specifies load reporting procedures over different interfaces, such as the Xn, X2, E1 and F1 interface. However, details regarding slice-level load metrics have not been specified in current NR standard. In particular, details regarding slice-level load information exchange over the Xn, F1, and/or E1 interfaces to support various scenarios such as CU/DU split and CP-UP separation have not been specified in the current standard.

Figure 1:
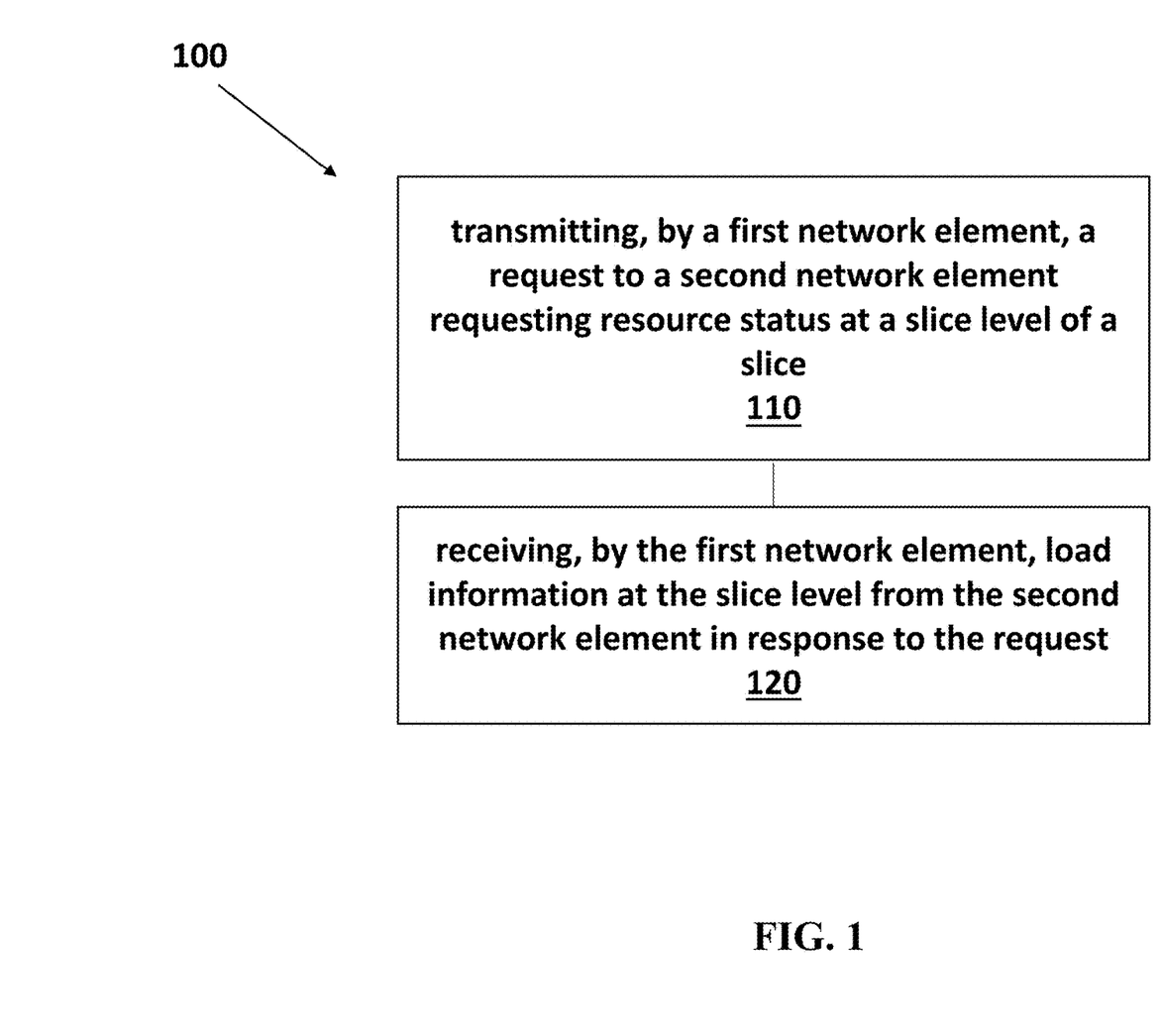
FIG. 1 is a flowchart representation of a method for wireless communication in accordance with the present technology.
Figure 5:
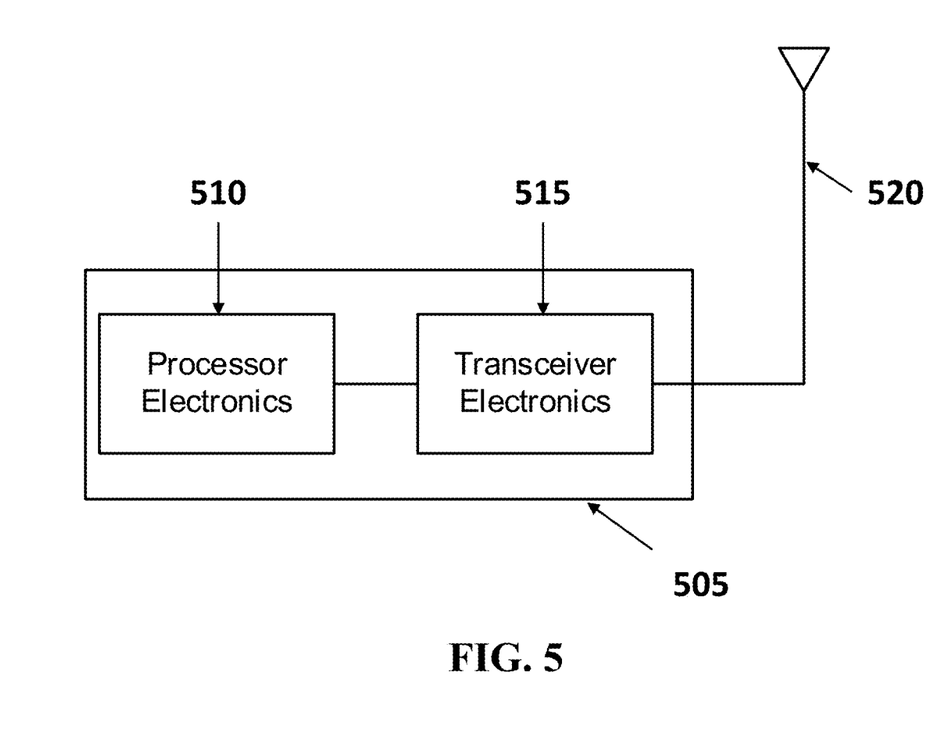
FIG. 5 is a block diagram representation of a portion of a radio station in accordance with one or more embodiments of the present technology can be applied.

This patent document discloses techniques that can be implemented in various embodiments to enable effective load metrics reporting and load balancing at slice-level in NR communication systems. The disclosed techniques can be used to provide necessary load metrics for effective load balancing in various scenarios, such as CU/DU split and/or CP-UP separation. FIG. 1 is a flowchart representation of a method 100 for wireless communication in accordance with the present technology. The method 100 includes, at operation 110, transmitting, by a first network element, a request to a second network element requesting resource status at a slice level of a slice. The slice represents a logical network of a physical network infrastructure. The method 100 also includes, at operation 120, receiving, by the first network element, load information at the slice level from the second network element in response to the request. In some embodiments, the network element may be a telecommunication equipment (or a portion of telecommunication equipment) that performs network functions. In some embodiments, the network element may be a network function that is implemented on a hardware platform that comprises a processor and a network interface (e.g., as shown in FIG. 5). In some embodiments, the network element may be implemented geographically at a same place as a base station. In some embodiments, the network element may be implemented in the core network at a location separate from a base station or a cell tower.

In some embodiments, the method includes receiving, by the first network element, a response acknowledging the request prior to receiving the load information from the second network element. In some embodiments, the method also includes performing, by the first network element, load balancing of user devices in communication with the second network element based on the load information at the slice level.

In some embodiments, the first network element comprises at least one of: a control plane of a centralized unit, a centralized unit, or a base station. In some embodiments, the second network element comprises at least one of: a user plane of a centralized unit, a distributed unit, or a base station.

In some embodiments, the load information is organized into dedicated information and shared information. In some embodiments, the load information at the slice level comprises Single Network Slice Selection Assistance Information (S-NSSAI).

In some embodiments, the load information at the slice level comprises slice-level Physical Resource Block (PRB) usage. In some embodiments, the slice-level PRB usage comprises downlink PRB usage and/or uplink PRB usage. In some embodiments, the slice level PRB usage comprises at least one of: Guaranteed Bit Rate (GBR) PRB usage, non-GBR PRB usage, or total PRB usage. In some embodiments, the slice-level PRB usage is omitted in the load information in case of the first element is a control plane of a centralized unit and the second element is a user plane of a centralized unit.

In some embodiments, the load information at the slice level comprises slice-level bearer usage. In some embodiments, the slice-level bearer usage comprises at least one of: number of bearers, or bearer composite available capacity. In some embodiments, a bearer for the slice-level bearer usage comprises a Data Radio Bearer (DRB), a radio bearer associated with a Quality of Service (QoS) flow, or a radio bearer associated with a Protocol Data Unit (PDU) session. In some embodiments, the slice-level bearer usage is omitted in the load information in case the first network element is a centralized unit and the second network element is a distributed unit.

In some embodiments, the load information at the slice level comprises slice-level Transport Network Layer (TNL) capacity load indicator. In some embodiments, the load information at the slice level comprises, or slice-level Radio Resource Control (RRC) connected users.

As further described in the present document, the above-described methods enable effective load metrics reporting and load balancing in various scenarios of NR communication systems. Some examples of the disclosed techniques are further described in the following example embodiments.

Embodiment 1

Figure 2:
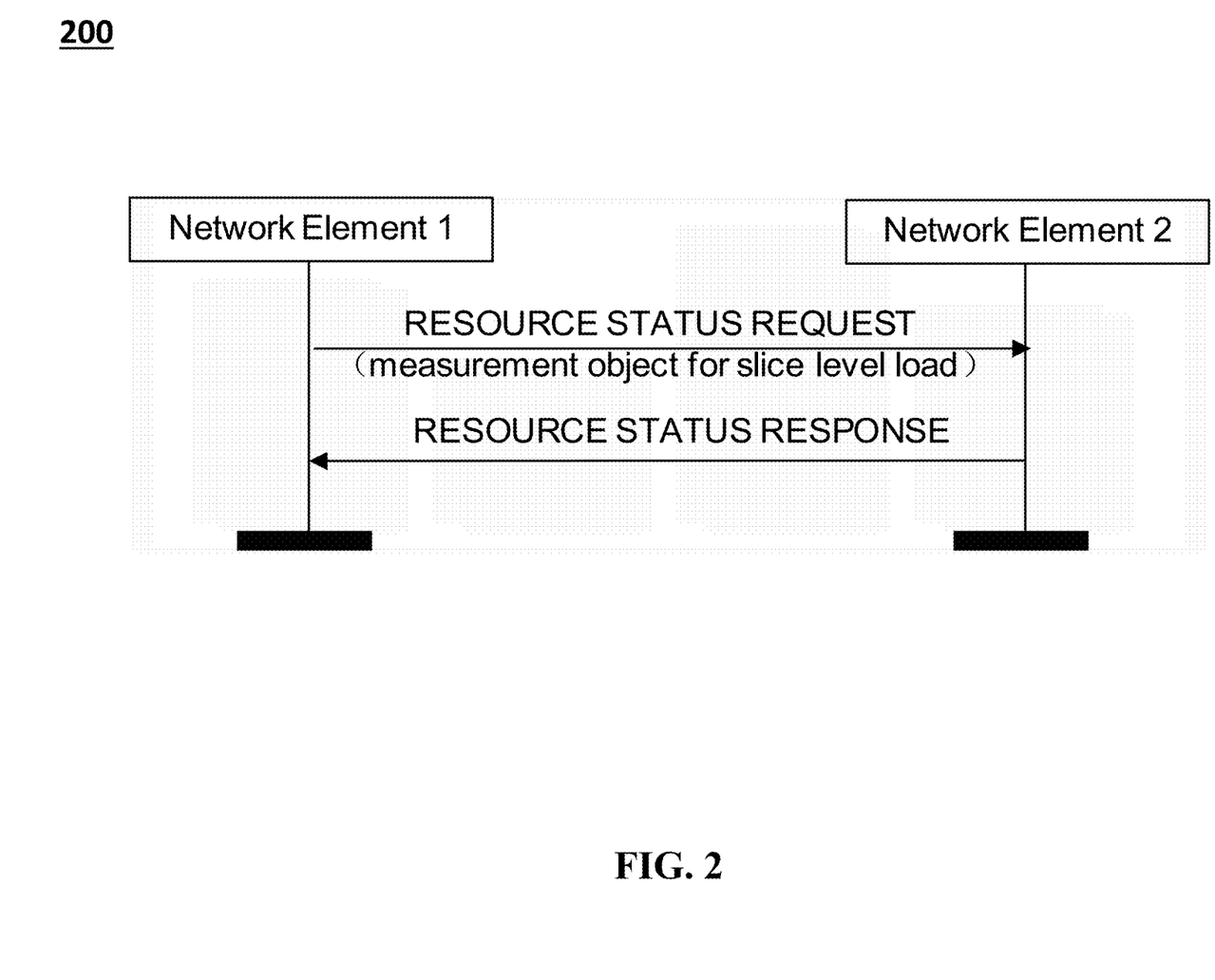
FIG. 2 shows an example procedure for initiating slice-level load measurements between network elements in accordance with the present technology.

FIG. 2 illustrates an example procedure for initiating slice-level load measurements between network elements in accordance with the present technology. The Network Element 1 sends a request (e.g., RESOURCE STATUS REQUEST message) to the Network Element 2. In NR communication networks, the Network Element 1 can be gNB-CU-CP, gNB-CU, eNB and/or gNB. The Network Element 2 can be gNB-CU-UP, gNB-DU and/or gNB. The request can include information about the measurement object(s) indicating the slice-level load information that needs to be measured by Network Element 2 and reported to Network Element 1. After receiving the request, the Network Element 2 can send a response message (e.g., RESOURCE STATUS RESPONSE message) to the Network Element 1 acknowledging that it has received the request.

Figure 3:
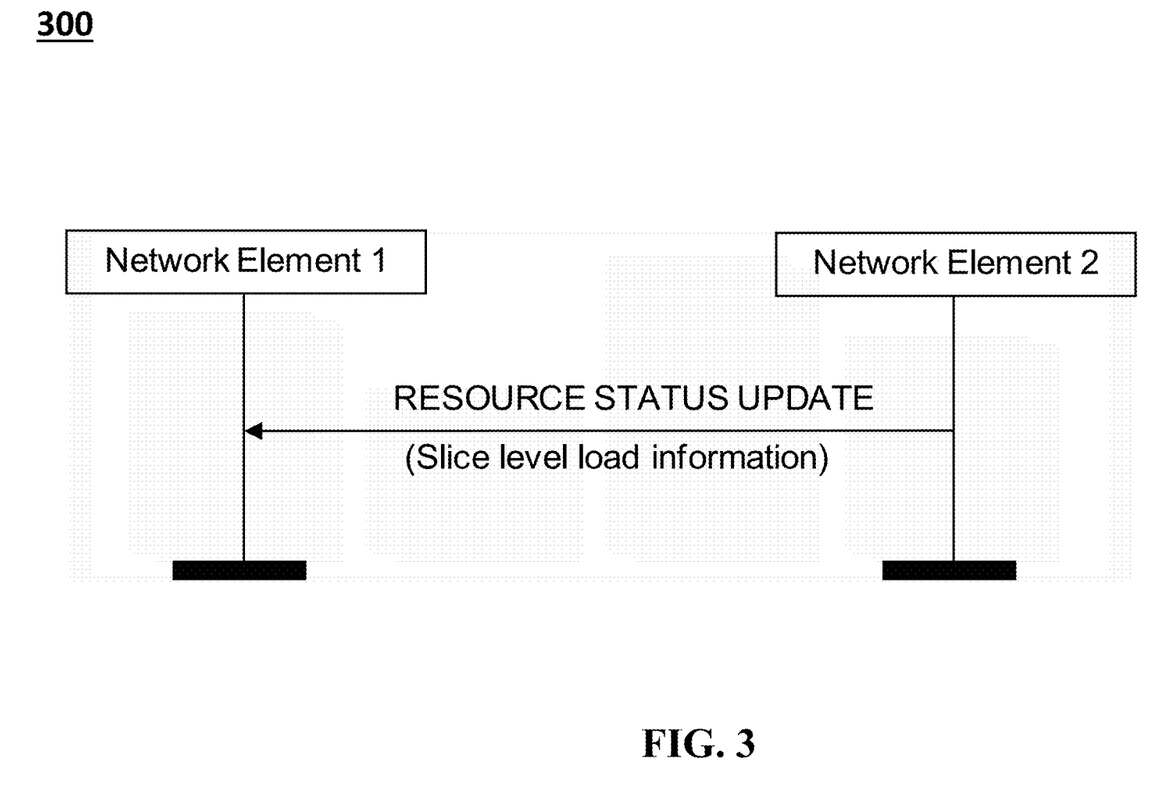
FIG. 3 illustrates an example procedure for transferring slice-level load information between network elements in accordance with the present technology.

FIG. 3 illustrates an example procedure for transferring slice-level load information between network elements in accordance with the present technology. After performing necessary measurements, the Network Element 2 transfers the requested slice-level load information to the Network Element 1 in a third message (e.g., RESOURCE STATUS UPDATE message). The slice level load information can include: Single Network Slice Selection Assistance Information (S-NSSAI), slice-level Physical Resource Block (PRB) usage, slice-level bearer usage, slice-level Transport Network Layer (TNL) capacity load indicator, and/or slice-level Radio Resource Control (RRC) connected users. Furthermore, the load information can be divided into two parts: dedicated slice information that is dedicated for a particular slice and shared slice information that is shared among multiple slices.

After receiving the slice-level load information, the Network Element 1 can perform load balancing accordingly. For example, the Network Element 1 can offload some User Equipment (UEs) from a first cell having a high slice load to a second cell with a low slice load within the Network Element 2. As another example, the Network Element can offload the UEs from the Network Element 2 entirely to a different network element.

Table 1 shows some example parameters of the slice-level load information.

TABLE 1

Example slice-level load information

| IE/Group Name | Presence | Range | IE type and reference | Semantics description |
|---|---|---|---|---|
| Slice Level Load | O | | | |
| >Dedicated Slice Measurement Result List | | 0 ... 1 | | |
| >>Dedicated Slice Measurement Result Item | | 1 ... <maxnoofSliceItems> | | |
| >>>S-NSSAI List | | 1 | | |
| >>>>S-NSSAI Item | | 1 ... <maxnoofSliceItems> | | |
| >>>>>S-NSSAI | M | | | |
| >>>>>Slice Level PRB Usage | O | | INTEGER (0 ... 100) | |
| >>>>>Slice Level Bearer Usage | O | | INTEGER (0 ... 100) | |
| >>>>>Slice Level RRC connected users | O | | INTEGER (0 ... 100) | |
| >>>>>TNL Capacity Load Indicator | O | | | |
| >Shared Slice Measurement Result List | | 0 ... 1 | | |
| >>Slice Measurement Result Item | | 1 ... <maxnoofSliceItems> | | |
| >>>Shared slices pool List | | 1 | | |
| >>>>Shared slices pool Item | | 1 ... <maxnoofSliceItems> | | |
| >>>>>shared slice pool name | O | | | There could be multiple shared slice pools, which can be either added or removed |
| >>>>>supported shared S-NSSAI list | M | | | Indicates which slice can use the shared resource. |
| >>>>>Slice Level PRB Usage | O | | INTEGER (0 ... 100) | |
| >>>>>Slice Level Bearer Usage | O | | INTEGER (0 ... 100) | |
| >>>>>Slice Level RRC connected users | O | | INTEGER (0 ... 100) | |
| >>>>>TNL Capacity Load Indicator | O | | | |

Embodiment 2

A Physical Resource Block (PRB) is a resource unit related to time domain, frequency domain and/or sub-carrier spacing. PRB usage can be determined by network elements to provide slice-level load information that assists subsequent load balancing.

In some embodiments, the slice-level PRB usage for dedicated slice load information can be derived based on: slice-level PRB usage (dedicated)=actual used PRB amount of the dedicated slice/the total PRB amount of the dedicated slice.

In some embodiments, the slice-level PRB usage for shared slice load information can be derived based on: slice-level PRB Usage (shared)=actual used PRB amount of the shared slices/the total PRB amount of the shared slices.

For example, in one specific example, Cell A has a total of 100 PRB as resources. There are three slices in the Cell A: Slice1, Slice2 and Slice3. The dedicated resources for Slice1 include 30 PRB, the dedicated resources for Slice2 include 30 PRB, and the dedicated resources for Slice 3 include 30 PRB. The shared resources by the three slices include 10 PRB. It is noted that the shared resources can be allocated based on scheduling priorities. For example, Slice1 has the highest priority and is scheduled two PRB out of the 10 shared PRB. The other two slices have lower priorities and can only occupy the remaining 8 PRB.

Cell A is now in communication with two UEs: UE1 and UE2. UE1's subscribed services are related to two slices: Slice1 (with 10 PRB) and Slice2 (with 32 PRB). UE2's subscribed services are related to two slices: Slice1 (with 5 PRB) and Slice3 (with 25 PRB). Thus, in addition to the dedicated resources, Slice 2 occupies 2 PRB in the shared resources.

Based on calculation of the dedicated and shared slice PRB usage as shown above, the following results can be obtained:

For dedicated slice PRB usage,
The PRB usage of Slice1=(10+5)/30=50%;
The PRB usage of Slice2=(32−2)/30=100%;
The PRB usage of Slice3=25/30=83%.
For shared slice PRB usage,
The PRB usage of Slice1 and Slice3=0/10=0%;
The PRB usage of Slice 2=2/10=20%.
The Overall PRB usage=2/10=20%

The network elements can communication the determined PRB usage in slice-level load information to assist subsequent load balancing (e.g. offloading UE1 to another cell).

Table 2 shows some example parameters of the slice-level PRB usage information.

TABLE 2

Example slice-level PRB usage information

| IE/Group Name | Presence | Range | IE type and reference | Semantics description |
|---|---|---|---|---|
| CHOICE Radio Resource Status Type | M | | | |
| >ng-eNB | | | | |
| >>DL GBR PRB usage | M | | INTEGER (0 . . . 100) | Per cell DL GBR PRB usage |
| >>UL GBR PRB usage | M | | INTEGER (0 . . . 100) | Per cell UL GBR PRB usage |
| >>DL non-GBR PRB usage | M | | INTEGER (0 . . . 100) | Per cell DL non-GBR PRB usage |
| >>UL non-GBR PRB usage | M | | INTEGER (0 . . . 100) | Per cell UL non-GBR PRB usage |
| >>DL Total PRB usage | M | | INTEGER (0 . . . 100) | Per cell DL Total PRB usage |
| >>UL Total PRB usage | M | | INTEGER (0 . . . 100) | Per cell UL Total PRB usage |
| >gNB | | | | |
| >>SSB Area Radio Resource Status List | | 1 | | |
| >>>SSB Area Radio Resource Status Item | | 1 . . . <maxnoof SSBAreas> | | |
| >>>>SSB Index | M | | INTEGER (0 . . . 63) | |
| >>>>SSB Area DL GBR PRB usage | M | | INTEGER (0 . . . 100) | Per SSB area DL GBR PRB usage |
| >>>>SSB Area UL GBR PRB usage | M | | INTEGER (0 . . . 100) | Per SSB area UL GBR PRB usage |
| >>>>SSB Area DL non-GBR PRB usage | M | | INTEGER (0 . . . 100) | Per SSB area DL non-GBR PRB usage |
| >>>>SSB Area UL non-GBR PRB usage | M | | INTEGER (0 . . . 100) | Per SSB area UL non-GBR PRB usage |
| >>>>SSB Area DL Total PRB usage | M | | INTEGER (0 . . . 100) | Per SSB area DL Total PRB usage |
| >>>>SSB Area UL Total PRB usage | M | | INTEGER (0 . . . 100) | Per SSB area UL Total PRB usage |
| >>DL scheduling PDCCH CCE usage | O | | INTEGER (0 . . . 100) | |
| >>UL scheduling PDCCH CCE usage | O | | INTEGER (0 . . . 100) | |

Embodiment 3

In wireless communications, a bearer refers to a path that connects two or more points in the communication system to allow data traffic to follow through. Bearer usage can also be provided in slice-level load information to assist subsequent load balancing. A bearer can be a Protocol Data Unit (PDU) session related radio bearer, a Quality of Service (QoS) flow related radio bearer, or a Data Radio Bearer (DRB). For example, slice-level bearer usage can include the number of radio bearers used and/or the bearer Composite Available Capacity (CAC). Table 3 shows some example parameters of the slice-level bearer usage information.

TABLE 3

Example slice-level bearer usage information

| IE/Group Name | Presence | Range |
|---|---|---|
| Number of Radio Bearers | O | BIT STRING (SIZE(24)) |
| Bearer Composite Available Capacity | O | |

Embodiment 4

As discussed above, scenarios such as CU/DU split and CP-UP separation can happen when the Network Element 1 is gNB-CU-CP, gNB-CU, eNB and/or gNB while the Network Element 2 is gNB-CU-UP, gNB-DU and/or gNB. Here are four example scenarios:

Scenario 1: Network Element 1 is eNB and Network Element 2 is gNB. In this scenario, the network elements communicate using the X2 interface.

Scenario 2: Network Element 1 is gNB and Network Element 2 is gNB. In this scenario, the network elements communicate using the Xn interface.

Scenario 3: Network Element 1 is gNB-CU and Network Element 2 is gNB-DU. In this scenario, the network elements communicate using the F1 interface.

Scenario 4: Network Element 1 is gNB-CU-CP and Network Element 2 is gNB-CU-UP. In this scenario, the network elements communicate using the E1 interface.

In different scenarios, details parameters for slice-level load information can be provided. Table 4 shows example parameters for the slice level load information that can be provided in scenarios 1 and 2.

TABLE 4

Example parameters for slice-level load information

| IE/Group Name | Presence | Range | IE type and reference | Semantics description |
|---|---|---|---|---|
| Slice Level Load | O | | | |
| >Dedicated Slice Measurement Result List | | 0 . . . 1 | | |
| >>Dedicated Slice Measurement Result Item | | 1 . . . <maxnoofSliceItems> | | |
| >>>S-NSSAI List | | 1 | | |
| >>>>S-NSSAI Item | | 1 . . . <maxnoofSliceItems> | | |
| >>>>>S-NSSAI | M | | | |
| >>>>>Slice Level PRB Usage | O | | INTEGER (0 . . . 100) | |
| >>>>>Slice Level Bearer Usage | O | | INTEGER (0 . . . 100) | |
| >>>>>Slice Level RRC connected users | O | | INTEGER (0 . . . 100) | |
| >>>>>TNL Capacity Load Indicator | O | | | |
| >Shared Slice Measurement Result List | | 0 . . . 1 | | |
| >>Slice Measurement Result Item | | 1 . . . <maxnoofSliceItems> | | |
| >>>Shared slices pool List | | 1 | | |
| >>>>Shared slices pool Item | | 1 . . . <maxnoofSliceItems> | | |
| >>>>>shared slice pool name | O | | | There could be multiple shared slice pools, which can be either added or removed |
| >>>>>supported shared S-NSSAI list | M | | | Indicates which slice can use the shared resource. |
| >>>>>Slice Level PRB Usage | O | | INTEGER (0 . . . 100) | |
| >>>>>Slice Level Bearer Usage | O | | INTEGER (0 . . . 100) | |
| >>>>>Slice Level RRC connected users | O | | INTEGER (0 . . . 100) | |
| >>>>>TNL Capacity Load Indicator | O | | | |

In scenario 3, when the information exchange is performed over the F1 interface (that is, CU/DU split), there is no need to include bearer usage in the slice level load information because split bearers are used. Table 5 shows example parameters for the slice level load information that can be provided in scenario 3.

TABLE 5

Example parameters for slice-level load information

| IE/Group Name | Presence | Range | IE type and reference | Semantics description |
|---|---|---|---|---|
| Slice Level Load | O | | | |
| >Dedicated Slice Measurement Result List | | 0 . . . 1 | | |
| >>Dedicated Slice Measurement Result Item | | 1 . . . <maxnoofSliceItems> | | |
| >>>S-NSSAI List | | 1 | | |
| >>>>S-NSSAI Item | | 1 . . . <maxnoofSliceItems> | | |
| >>>>>S-NSSAI | M | | | |
| >>>>>Slice Level PRB Usage | O | | INTEGER (0 . . . 100) | |
| >>>>>TNL Capacity Load Indicator | O | | | |

TABLE 5-continued

Example parameters for slice-level load information

| IE/Group Name | Presence | Range | IE type and reference | Semantics description |
|---|---|---|---|---|
| >Shared Slice Measurement Result List | | 0 . . . 1 | | |
| >>Slice Measurement Result Item | | 1 . . . <maxnoofSliceItems> | | |
| >>>Shared slices pool List | | 1 | | |
| >>>>Shared slices pool Item | | 1 . . . <maxnoofSliceItems> | | |
| >>>>>shared slice pool name | O | | | There could be multiple shared slice pools, which can be either added or removed |
| >>>>>supported shared S-NSSAI list | M | | | Indicates which slice can use the shared resource. |
| >>>>>Slice Level PRB Usage | O | | INTEGER (0 . . . 100) | |
| >>>>>TNL Capacity Load Indicator | O | | | |

In scenario 4, when the information exchange is performed over the E1 interface (that is, CP-UP separation), there is no need to include PRB usage in the slice level load information. Table 6 shows example detailed parameters for the slice level load information needed in scenario 4.

TABLE 6

Example parameters for slice-level load information

| IE/Group Name | Presence | Range | IE type and reference | Semantics description |
|---|---|---|---|---|
| Slice Level Load | O | | | |
| >Dedicated Slice Measurement Result List | | 0 . . . 1 | | |
| >>Dedicated Slice Measurement Result Item | | 1 . . . <maxnoofSliceItems> | | |
| >>>S-NSSAI List | | 1 | | |
| >>>>S-NSSAI Item | | 1 . . . <maxnoofSliceItems> | | |
| >>>>>S-NSSAI | M | | | |
| >>>>>Slice Level Bearer Usage | O | | INTEGER (0 . . . 100) | |
| >>>>>TNL Capacity Load Indicator | O | | | |
| >Shared Slice Measurement Result List | | 0 . . . 1 | | |
| >>Slice Measurement Result Item | | 1 . . . <maxnoofSliceItems> | | |
| >>>Shared slices pool List | | 1 | | |
| >>>>Shared slices pool Item | | 1 . . . <maxnoofSliceItems> | | |
| >>>>>shared slice pool name | O | | | There could be multiple shared slice pools, which can be either added or removed |
| >>>>>supported shared S-NSSAI list | M | | | Indicates which slice can use the shared resource. |
| >>>>>Slice Level Bearer Usage | O | | INTEGER (0 . . . 100) | |
| >>>>>TNL Capacity Load Indicator | O | | | |

Figure 4:
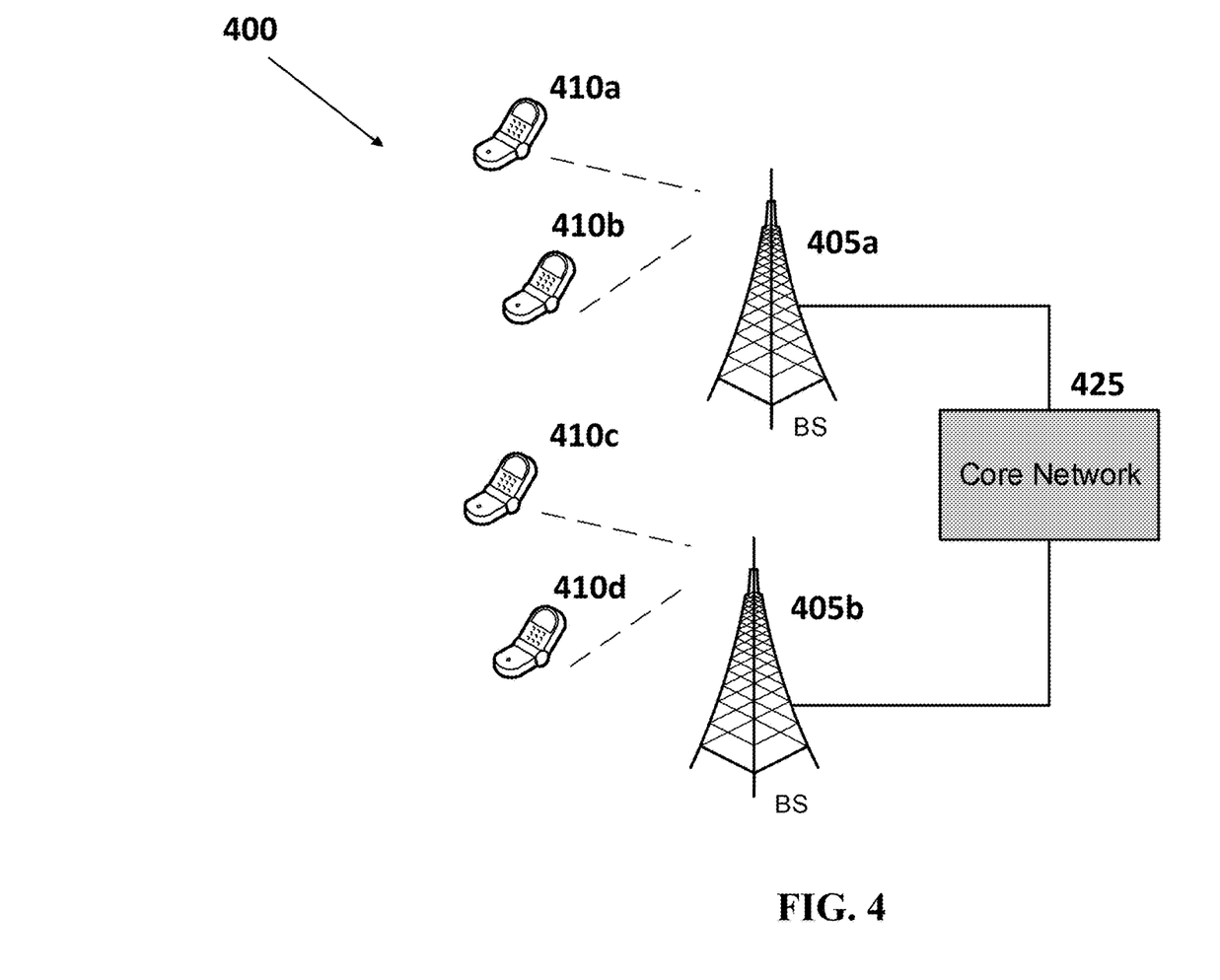
FIG. 4 shows an example of a wireless communication system where techniques in accordance with one or more embodiments of the present technology can be applied.

FIG. 4 shows an example of a wireless communication system 400 where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies. The techniques and embodiments described in the present document may be implemented by the base stations of wireless devices described in the present document.

FIG. 5 is a block diagram representation of a portion of a radio station in accordance with one or more embodiments of the present technology can be applied. A network element can be implemented as a radio station 505 such as a base station (eNB, gNB, gNB-CU, gNB-DU, gNB-CU-CP, and/or gNB-CU-UP) that can include processor electronics 510 such as a microprocessor that implements one or more of the wireless techniques presented in this document. The radio station 605 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505. In some embodiments, the radio station 505 may be configured to perform the methods described herein.

It will be appreciated that the present document discloses techniques that can be embodied in various embodiments to provide relevant details about slice-level load information to enable effective load metrics reporting and load balancing. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
transmitting, by a first network element, a resource status request to a second network element requesting measurements of resource status at a slice level of a slice, wherein the slice represents a logical network of a physical network infrastructure, wherein the first network element comprises at least one of: a control plane of a centralized unit, a centralized unit, or a base station, and wherein the second network element comprises at least one of: a user plane of a centralized unit, a distributed unit, or a base station;
receiving, by the first network element, a resource status response from the second network element in response to the resource status request;
receiving, by the first network element, a resource status update message from the second network element, wherein the resource status update message comprises one or more measurement results based on the measurements, wherein the one or more measurement results comprise load information at the slice level represented as a list of Single Network Slice Selection Assistance information (S-NSSAI) items, and wherein each item of the list of S-NSSAI items is identified by an S-NSSAI value and indicates at least a capacity load associated with the S-NSSAI item; and
performing, by the first network element, load balancing with the second network element based on the load information at the slice level.

2. The method of claim 1, wherein the one or more measurement results comprise slice-level Physical Resource Block (PRB) usage.

3. The method of claim 2, wherein the slice-level PRB usage comprises downlink PRB usage and/or uplink PRB usage.

4. The method of claim 2, wherein the slice-level PRB usage comprises at least one of: Guaranteed Bit Rate (GBR) PRB usage, non-GBR PRB usage, or total PRB usage.

5. The method of claim 1, wherein the load information at the slice level comprises slice-level bearer usage, and wherein the slice-level bearer usage is omitted in the load information in case the first network element is a centralized unit and the second network element is a distributed unit.

6. A method for wireless communication, comprising:
receiving, by a second network element, a resource status request from a first network element to enable the second network element to perform measurements of resource status at a slice level of a slice, wherein the slice represents a logical network of a physical network infrastructure, wherein the first network element comprises at least one of: a control plane of a centralized unit, a centralized unit, or a base station, and wherein the second network element comprises at least one of: a user plane of a centralized unit, a distributed unit, or a base station; and
transmitting, by the second network element, a resource status response to the first network element in response to the resource status request; and
transmitting, by the second network element, a resource status update message to the first network element to enable the first network element to perform load balancing with the second network element, wherein the resource status update message comprises one or more measurement results based on the measurements, wherein the one or more measurement results comprise load information at the slice level represented as a list of Single Network Slice Selection Assistance information (S-NSSAI) items, and wherein each item of the list of S-NSSAI items is identified by an S-NSSAI value and indicates at least a capacity load associated with the S-NSSAI item.

7. The method of claim 6, wherein the one or more measurement results comprise slice-level Physical Resource Block (PRB) usage.

8. The method of claim 7, wherein the slice-level PRB usage comprises downlink PRB usage and/or uplink PRB usage.

9. The method of claim 7, wherein the slice level PRB usage comprises at least one of: Guaranteed Bit Rate (GBR) PRB usage, non-GBR PRB usage, or total PRB usage.

10. The method of claim 6, wherein the load information at the slice level comprises slice-level bearer usage, and wherein the slice-level bearer usage is omitted in the load information in case the first network element is a centralized unit and the second network element is a distributed unit.

11. A communication apparatus implemented as a first network element, comprising:
a processor that is configured to:
transmit a resource status request to a second network element requesting measurements of resource status at a slice level of a slice, wherein the slice represents a logical network of a physical network infrastructure, wherein the first network element comprises at least one of: a control plane of a centralized unit, a centralized unit, or a base station, and wherein the second network element comprises at least one of: a user plane of a centralized unit, a distributed unit, or a base station;
receive a resource status response from the second network element in response to the status resource request;
receive a resource status update message from the second network element, wherein the resource status update message comprises one or more measurement results based on the measurements, wherein the one or more measurement results comprise load information at the slice level represented as a list of Single Network Slice Selection Assistance information (S-NSSAI) items, and wherein each item of the list of S-NSSAI items is identified by an S-NSSAI value and indicates at least a capacity load associated with the S-NSSAI item; and
perform load balancing with the second network element based on the load information at the slice level.

12. The communication apparatus of claim 11, wherein the one or more measurement results comprise slice-level Physical Resource Block (PRB) usage.

13. The communication apparatus of claim 12, wherein the slice-level PRB usage comprises downlink PRB usage and/or uplink PRB usage.

14. The communication apparatus of claim 12, wherein the slice-level PRB usage comprises at least one of: Guaranteed Bit Rate (GBR) PRB usage, non-GBR PRB usage, or total PRB usage.

15. The communication apparatus of claim 11, wherein the load information at the slice level comprises slice-level bearer usage, and wherein the slice-level bearer usage is omitted in the load information in case the first network element is a centralized unit and the second network element is a distributed unit.

16. A communication apparatus implemented as a second network element, comprising:
a processor that is configured to:
receive a resource status request from a first network element to enable the second network element to perform measurements of resource status at a slice level of a slice, wherein the slice represents a logical network of a physical network infrastructure, wherein the first network element comprises at least one of: a control plane of a centralized unit, a centralized unit, or a base station, and wherein the second network element comprises at least one of: a user plane of a centralized unit, a distributed unit, or a base station; and
transmit a resource status response to the first network element in response to the resource status request; and
transmit a resource status update message to the first network element to enable the first network element to perform load balancing with the second network element, wherein the resource status update message comprises one or more measurement results based on the measurements, wherein the one or more measurement results comprise load information at the slice level represented as a list of Single Network Slice Selection Assistance information (S-NSSAI) items, and wherein each item of the list of S-NSSAI items is identified by an S-NSSAI value and indicates at least a capacity load associated with the S-NSSAI item.

17. The communication apparatus of claim 16, wherein the load information at the slice level comprises slice-level Physical Resource Block (PRB) usage.

18. The communication apparatus of claim 17, wherein the slice-level PRB usage comprises downlink PRB usage and/or uplink PRB usage.

19. The communication apparatus of claim 17, wherein the slice level PRB usage comprises at least one of: Guaranteed Bit Rate (GBR) PRB usage, non-GBR PRB usage, or total PRB usage.

20. The communication apparatus of claim 16, wherein the load information at the slice level comprises slice-level bearer usage, and wherein the slice-level bearer usage is omitted in the load information in case the first network element is a centralized unit and the second network element is a distributed unit.

* * * * *